United States Patent
Sato et al.

(10) Patent No.: US 9,724,754 B2
(45) Date of Patent: Aug. 8, 2017

(54) ALUMINUM PRODUCT MANUFACTURING METHOD USING DIE CASTING AND ALUMINUM BRAKE CALIPER MANUFACTURING METHOD USING THE SAME

(71) Applicant: NIPPON LIGHT METAL COMPANY, LTD., Shinagawa-ku, Tokyo (JP)

(72) Inventors: Shinya Sato, Nagano (JP); Takaaki Ikari, Nagano (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 572 days.

(21) Appl. No.: 14/366,039

(22) PCT Filed: Dec. 4, 2012

(86) PCT No.: PCT/JP2012/007757
§ 371 (c)(1),
(2) Date: Jun. 17, 2014

(87) PCT Pub. No.: WO2013/094132
PCT Pub. Date: Jun. 27, 2013

(65) Prior Publication Data
US 2014/0360633 A1   Dec. 11, 2014

(30) Foreign Application Priority Data

Dec. 20, 2011 (JP) .................................. 2011-278027

(51) Int. Cl.
*B22D 17/00* (2006.01)
*B22D 19/00* (2006.01)
(Continued)

(52) U.S. Cl.
CPC ................ *B22D 19/00* (2013.01); *B22C 9/24* (2013.01); *B22D 17/00* (2013.01); *B22D 17/20* (2013.01);
(Continued)

(58) Field of Classification Search
CPC ........ B22D 17/00; B22D 17/20; B22D 17/22; B22D 19/00; B22D 21/007; B22D 25/02; B22D 30/00; B22C 9/24
(Continued)

(56) References Cited

U.S. PATENT DOCUMENTS 5,168,964 A    12/1992  Shimmell
2002/0020510 A1*  2/2002  Nakao et al. ............. B22C 9/22
                                                          164/5

FOREIGN PATENT DOCUMENTS

EP          0510930 A1   10/1992
JP          S61-150747 A   7/1986
(Continued)

OTHER PUBLICATIONS

A Chinese office action letter issued on Mar. 2, 2015 in the counterpart Chinese patent application.

*Primary Examiner* — Kevin P Kerns
(74) *Attorney, Agent, or Firm* — Mots Law, PLLC

(57) ABSTRACT

There are provided a method of manufacturing an aluminum product and a method of manufacturing an aluminum brake caliper each using die casting, for improving flow and run of molten metal during casting and enhancing productivity and quality. In a method of manufacturing an aluminum product provided with opposing portions opposed to each other with a hollow portion interposed in between, and connecting portions connecting the opposing portions at two sides thereof, the method includes a die casting step of performing casting by pouring molten metal of an aluminum alloy from
(Continued)

a gate for the molten metal formed in one of the opposing portions via the connecting portions and a bridge connecting the two opposing portions, and a bridge removing step of removing the bridge.

14 Claims, 13 Drawing Sheets

(51) Int. Cl.
| | |
|---|---|
| *B22D 21/00* | (2006.01) |
| *B22D 25/02* | (2006.01) |
| *B22C 9/24* | (2006.01) |
| *B22D 17/20* | (2006.01) |
| *B22D 17/22* | (2006.01) |
| *B22D 30/00* | (2006.01) |
| *F16D 55/22* | (2006.01) |

(52) U.S. Cl.
CPC ........... *B22D 17/22* (2013.01); *B22D 21/007* (2013.01); *B22D 25/02* (2013.01); *B22D 30/00* (2013.01); *F16D 55/22* (2013.01); *F16D 2200/003* (2013.01); *F16D 2250/0007* (2013.01)

(58) Field of Classification Search
USPC .............................................. 164/61, 93, 113
See application file for complete search history.

(56) References Cited

FOREIGN PATENT DOCUMENTS

| | | |
|---|---|---|
| JP | H02-217133 A | 8/1990 |
| JP | H05-118360 A | 5/1993 |
| JP | 2000220667 A | 8/2000 |
| JP | 2003048042 A | 2/2003 |
| WO | 2004002658 A1 | 1/2004 |

\* cited by examiner

FIG. 11
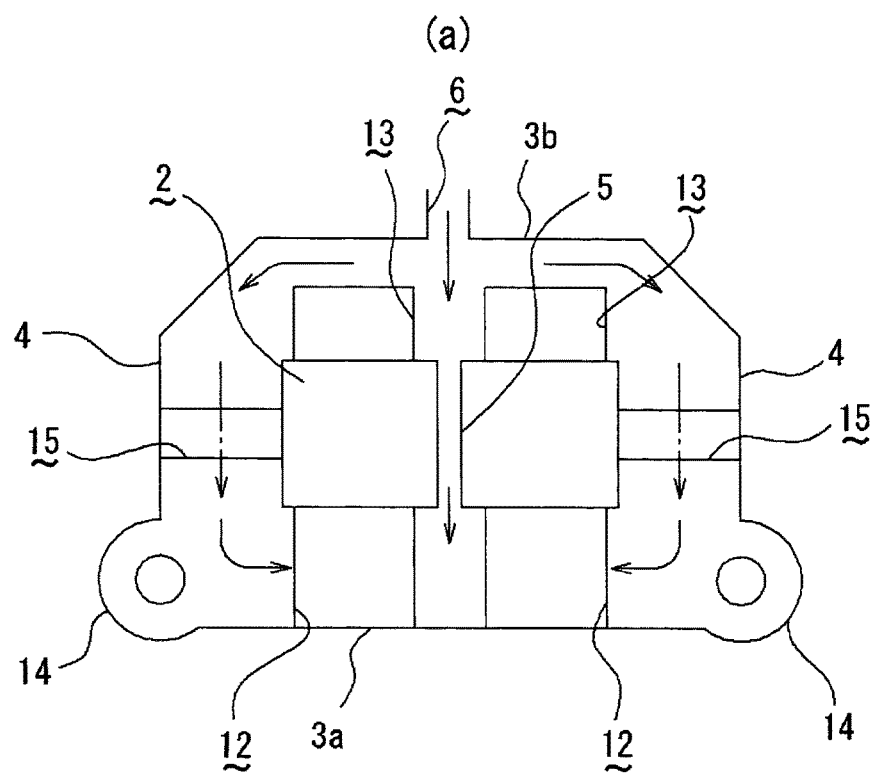
(a)
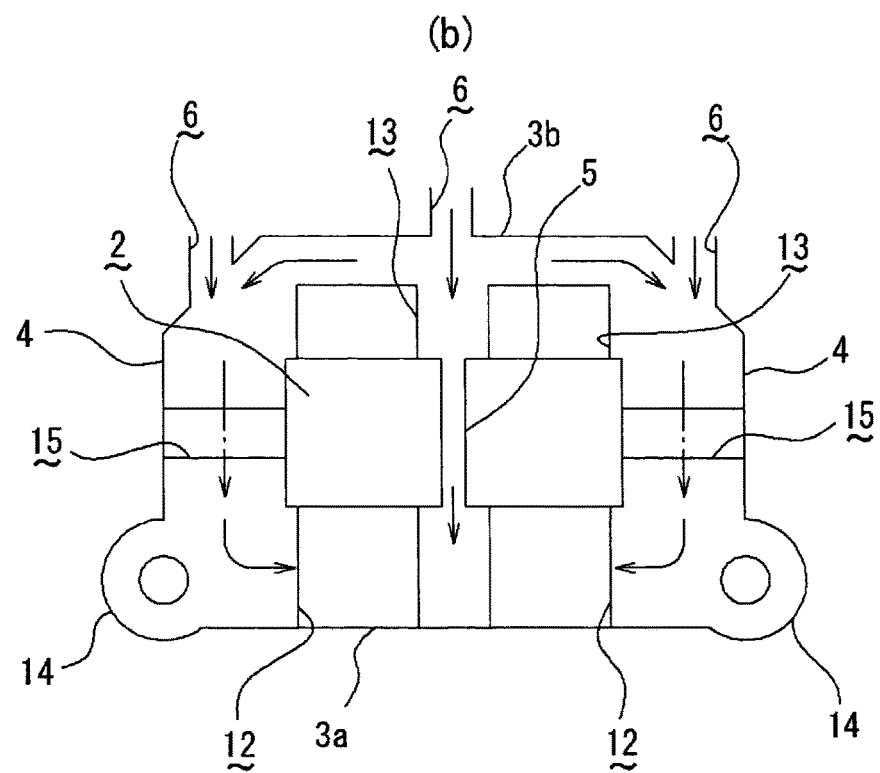
(b)

ALUMINUM PRODUCT MANUFACTURING METHOD USING DIE CASTING AND ALUMINUM BRAKE CALIPER MANUFACTURING METHOD USING THE SAME

TECHNICAL FIELD

The present invention relates to an aluminum product manufacturing method using die casting, and an aluminum brake caliper manufacturing method using the same.

BACKGROUND ART

Various methods have been used to cast aluminum products. Examples of the methods include: gravity die casting; and low-pressure casting in which molten metal is poured into a casting cavity by being lifted against gravity. In addition, die casting in which molten metal is poured (injected and filled) into a casting cavity at high speed with high pressure has been known as a technique for making accuracy of dimensions and productivity better than the above-mentioned casting methods. Die casting has been used as an aluminum product manufacturing method as well. A familiar variant of die casting is pore-free die casting, which has been used to prevent gas porosity defects from occurring due to trapping air in the cavity.

In general, aluminum disc brake calipers (hereinafter referred to as brake calipers) have been manufactured by use of the gravity casting method as shown in Patent Literature 1, for example. There is also a document such as Patent Literature 2 which suggests manufacture of brake calipers using die casting, but this document does not state a specific manufacturing method thereof.

The brake caliper has a complicated shape in which: the brake caliper includes opposing portions opposed to each other with a housing space (a hollow portion) for housing a disc being interposed in between, and connecting portions connecting the opposing portions at two sides thereof, respectively; and a cylinder portion into which a piston can be fitted is formed in each of the opposing portions.

In addition, higher final dimensional accuracy is required for the brake caliper, because the brake caliper is configured to stop the disc in high-speed rotation by sandwiching the disc by brake pads attached to the pistons. For this reason, if the brake caliper is manufactured using die casting which enables casting with higher dimensional accuracy, the number of final finishing processes can be reduced. In this context, the realization of the manufacture of the brake caliper using die casting has been awaited.

CITATION LIST

Patent Literature

Patent Literature 1: Japanese Patent Application Publication No. 2000-220667 (FIG. 2)
Patent Literature 2: Japanese Patent Application Publication No. Hei 5(1993)-118360 (Paragraph 0013)

SUMMARY OF INVENTION

Technical Problem

In a case where, however, an aluminum product having a complicated shape like the brake caliper is manufactured using die casting, restrictions are imposed on a layout of a die parting line, a layout of a core, and on a structure of the die such as a layout of a gate for molten metal.

For this reason, molten metal poured in from one opposing portion detours to the other opposing portion via the connecting portions on the two sides. As a consequence, the flow and run of the molten metal slow down. The slower flow and run may cause small pores and gas porosity defects, leading to a reduction in quality. A similar problem occurs in a product which involves a molten metal passage having a portion in a part of the molten passage with large passage resistance against molten metal.

The present invention has been made with the foregoing circumstances taken into consideration. An object of the present invention is to provide: an aluminum product manufacturing method using die casting which improves flow and run of molten metal during casting, and accordingly enhances productivity and quality; and an aluminum brake caliper manufacturing method using the same.

Solution to Problem

To attain the object, an aluminum product manufacturing method using die casting is a method for manufacturing an aluminum product provided with opposing portions opposed to each other with a hollow portion interposed in between, and connecting portions connecting the opposing portions at two sides thereof. Here, the method includes: a die casting step of performing casting by pouring molten metal of an aluminum alloy from a gate for the molten metal formed in one of the opposing portions via the connecting portions and a bridge connecting the two opposing portions; and a bridge removing step of removing the bridge.

The configuration like this causes the molten metal poured in from one of the two opposing portions to pass through the connecting portions on the two sides as well as the bridge connecting the opposing portions, and to flow to the other opposing portion. For this reason, the flow and run of the molten metal can be improved.

One or more embodiments may include a case where the aluminum product involves a molten metal passage from the gate which has a portion in a part of the molten metal passage with large passage resistance against the molten metal, or a case where the aluminum product involves a molten metal passage from the gate which has a portion in a part thereof receding from a segment having a small cross section for the molten metal passage to define a large volume.

Meanwhile, a cross section of the bridge may be shaped like any one of a circle, a horizontally long ellipse, and a polygon. In this case, the bridge is preferably formed on a straight line from the gate.

The configuration like any of the above decreases the passage resistance against the molten metal when the cross section of the bridge is shaped like a circle or an ellipse. In addition, when the cross section of the bridge is shaped like a polygon, freedom in designing the position of the bridge can be increased because a part of the bridge overlapping the parting line serves the purpose.

Meanwhile, a ratio of a cross-sectional area of the bridge to an opening area of the gate for the molten metal is preferably set in a range of 0.5 to 10.

If the ratio of the cross-sectional area of the bridge to the opening area of the gate is less than 0.5, resistance against the flow of the molten metal is more likely to increase, and the effect on the improvement in the run of the molten metal thus decreases. On the other hand, if the ratio of the cross-sectional area of the bridge to the opening area of the gate is greater than 10, the volume of the bridge becomes too large, and the proportion of a part not essentially required thus increases. This is disadvantageous in terms of costs reflecting an increase in workload of a removal process and the like.

In the meantime, one or more embodiments may provide the aluminum product manufacturing method using die casting, in which when the opposing portions require a core, the gate is formed in the opposing portion which is not on a side from which the core is detached.

Meanwhile, one or more embodiments may provide the aluminum product manufacturing method using die casting, in which any one or both of an opening portion and a recessed portion requiring a core are formed in any one or both of the two opposing portions by use of the same core in a way to be arranged on a straight line, and the gate is formed in the opposing portion including the recessed portion.

One or more embodiments may provide the aluminum product manufacturing method using die casting, which further includes a heat treatment step of subjecting a semi-finished product cast in the die casting step to a heat treatment before the bridge removing step. In this case, the heat treatment step is a heat treatment step including solutionizing. In addition, quenching by water cooling is preferably carried out after the solutionizing.

The configuration like any of the above makes it possible to increase the strength of the product by subjecting the semi-finished product cast in the die casting step to, for example, a T6 treatment (a treatment to perform solutionizing, quenching, and artificial age hardening). In this treatment, since the bridge is provided in the hollow portion of the semi-finished product, deformation of the product due to its softening in association with the heating during the heat treatment can be prevented or inhibited. In this case, the solutionizing can prevent or inhibit the deformation from occurring due to rapid cooling by the quenching after the solutionizing.

In one or more embodiments, the die casting step may be performed using an arbitrary method as long as the method carries out high-pressure high-speed filling. It is desirable, however, that the method applies any of vacuum die casting, oxygen-atmosphere die casting, and a combination of the vacuum die casting and the oxygen-atmosphere die casting. In this case, the vacuum die casting can prevent small bubbles and gas porosity defects in the molten metal, because the vacuum die casting is a method in which: for the purpose of preventing air and gases from being drawn into the molten metal, the air and gases are sucked from the die cavities by use of a vacuum pump immediately before the molten metal is poured (injected and filled) into the die cavities; and after the pressure in the die cavities is decreased, the molten metal is poured (injected and filled) in the die cavities. Meanwhile, the oxygen-atmosphere die casting can prevent small bubbles and gas porosity defects in the molten metal, because the oxygen-atmosphere die casting is a method in which after air in the molten metal passages and the die cavities is replaced with an oxygen gas, the molten metal is poured (injected and filled) into the die cavities. Furthermore, the T6 treatment can be performed by use of the vacuum die casting and the oxygen-atmosphere die casting.

While the opposing portions only need to be connected together using at least one bridge, the opposing portions may also be connected together using a plurality of the bridges. Meanwhile, the molten metal may be poured in from a plurality of the gates.

The configuration like this makes it possible to improve the flow and run of the molten metal.

A first aluminum brake caliper manufacturing method is a method of manufacturing an aluminum brake caliper using any one of the manufacturing methods. Here, a brake caliper in which the hollow portion forms a disc housing space is manufactured using any one of the manufacturing methods.

A second aluminum brake caliper manufacturing method is a method of manufacturing an aluminum brake caliper using any one of the manufacturing methods. Here, a brake caliper in which the hollow portion forms a disc housing space, and the gate for the molten metal is formed in the opposing portion including a recessed portion, is manufactured using any one of the manufacturing methods.

The configuration like any of the above causes the molten metal poured in from one of the two opposing portions to pass through the connecting portions on the two sides as well as the bridge connecting the opposing portions, and to flow to the other opposing portion when the configuration is applied to the brake caliper including the opposing portions opposed to each other with the hollow portion interposed in between. For this reason, the flow and run can be improved. Furthermore, the configuration like this makes it easy to design the die.

In the aluminum brake caliper manufacturing method, it is preferable that the recessed portions be formed respectively in two places in a center portion of the housing space, and the bridge be situated in an intermediate portion between the two recessed portions, so as to cause the molten metal flow through the bridge to flow to the opposing portion.

The configuration like this makes it possible to make the flow and run of the molten metal even and fast.

Meanwhile, in the aluminum brake caliper manufacturing method of claim 17, it is preferable that the recessed portions be formed respectively in at least three places, and the bridge be situated between each adjacent two of the recessed portions.

The configuration like this enables the molten metal flowing through each bridge to flow toward the two adjacent recessed portions. For this reason, it is possible to improve the flow and run of the molten metal.

Advantageous Effects of Invention

Because of the foregoing configurations, remarkable effects as follows can be obtained.

(1) According to one or more embodiments, the molten metal poured in from one of the two opposing portions opposed to each other with the hollow portion interposed in between is made to pass through the connecting portions on the two sides as well as the bridge connecting the opposing portions, and to flow to the other opposing portion. Thereby, it is possible to improve the flow and run. Thus, it is possible to enhance productivity and to enhance quality by preventing small bubbles in the molten metal and gas porosity defects.

(2) According to one or more embodiments, the semi-finished product cast in the die casting step is subjected to the heat treatment, for example, the T6 treatment (the treatment to perform solutionizing, quenching, and artificial age hardening). Thereby, the strength of the product can be increased in addition to the above-described Point (1). Furthermore, since the bridge is placed in the hollowing portion of the semi-finished product, the deformation of the product can be prevented or inhibited. Accordingly, the rigidity of the product can be increased.

(3) According to one or more embodiments, small bubbles in the molten metal and gas porosity defects can be prevented. For this reason, the quality can be further enhanced in addition to the above-described Points (1) and (2).

(4) According to one or more embodiments, the flow and run of the molten metal can be improved further. For this reason, in addition to Points (1) to (3), it is possible to further enhance the productivity and the quality.

(5) According to one or more embodiments, in the brake caliper including the opposing portions opposed to each other with the hollow portion for housing the disc interposed in between, the molten metal poured in from one of the two opposing portions is made to pass through the connecting portions on the two sides as well as the bridge connecting the opposed portions, and to flow to the other opposing portion. Thus, the flow and run of the molten metal can be further improved. For this reason, in addition to Points (1) to (4), it is possible to enhance the productivity of the brake caliper, and to enhance the quality by preventing small bubbles in the molten metal and gas porosity defects.

(6) According to one or more embodiments, the flow and run of the molten metal can be made even and fast. For this reason, in addition to Point (5), it is possible to further enhance the productivity of the brake caliper and to enhance the quality by preventing small bubbles in the molten metal and gas porosity defects.

(7) According to one or more embodiments, the flow and run of the molten metal can be improved. For this reason, in addition to Point (5), it is possible to further enhance the productivity of the brake caliper and to enhance the quality by preventing small bubbles in the molten metal and gas porosity defects.

BRIEF DESCRIPTION OF DRAWINGS

FIG. 11 includes a schematic cross-sectional view (a) showing a flow of molten metal for the brake caliper, and a schematic cross-sectional view (b) showing a different flow of the molten metal for the brake caliper.

DESCRIPTION OF EMBODIMENTS

Detailed descriptions will be provided for modes for carrying out the present invention by referring to the attached drawings.

To begin with, descriptions will be provided for aluminum products produced by a die casting process used in each manufacturing method of the present invention by referring to FIGS. 1 to 11.

First Embodiment

Figure 1:
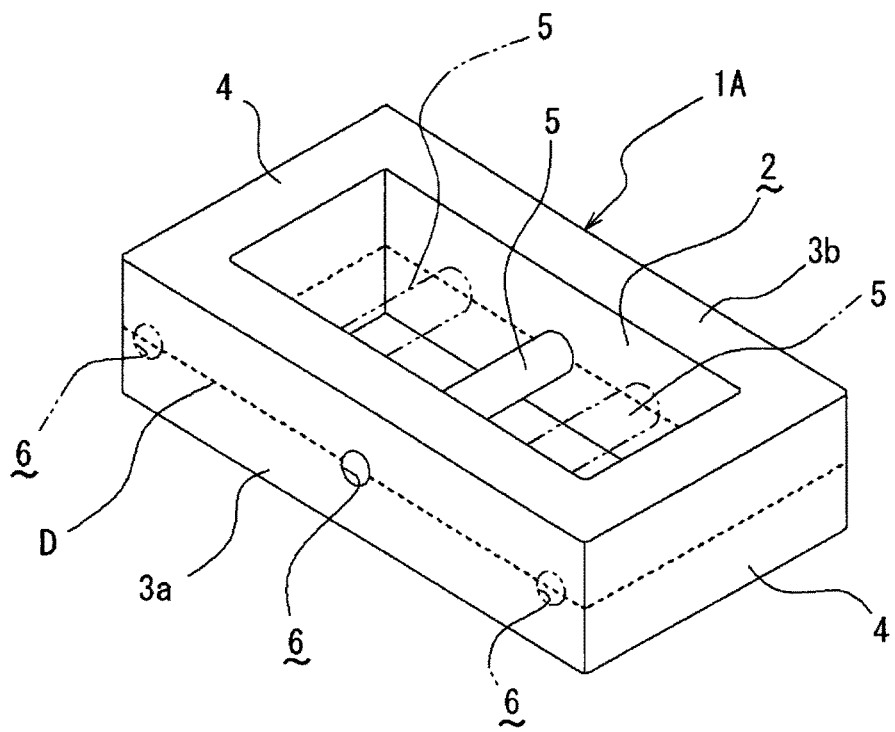
FIG. 1 is a perspective view showing a first embodiment of an aluminum product produced using a die casting process of the present invention.

As shown in FIG. 1, an aluminum product 1A (hereinafter referred to as a product 1A) of a first embodiment is formed in a shape of a hollow rectangle, which includes: opposing portions 3a, 3b opposed to each other with a hollow portion 2 interposed in between; and a pair of connecting portions 4 connecting the opposing portions 3a, 3b at two sides thereof. A bridge 5, which will be removed after a die casting process, is connected to the opposing portions 3a, 3b in the center portion of the hollow portion 2. The hollow portion 2, the opposing portions 3a, 3b, the connecting portions 4 and the bridge 5 are formed by filling molten metal into a cavity formed by die halves, albeit not illustrated.

In this case, the cross section of the bridge 5 is shaped like a circle or a horizontally long ellipse, for example. In a case where the cross section of the bridge 5 is shaped like a circle or an ellipse, the diameter of the bridge 5 needs to be situated on a parting line D between the die halves (not illustrated). As a result, flow resistance of the molten metal can be reduced. Instead, the cross section of the bridge 5 may be shaped like a polygon. When the cross section of the bridge 5 is shaped like the polygon, freedom in designing the position of the bridge 5 can be increased because a part of bridge 5 overlapping the parting line D serves the purpose.

A molten metal gate 6 for pouring molten metal is provided to one opposing portion 3a of the die, while an overflow gate (not illustrated) is provided to the other opposing portion 3b of the die. In this case, the gate 6 and the bridge 5 are situated on the parting line D (indicated with a dotted line) between the die halves, albeit not illustrated. Here, multiple gates 6 may be provided at positions such as laterally symmetrical positions in addition to the center portion.

Figure 2:
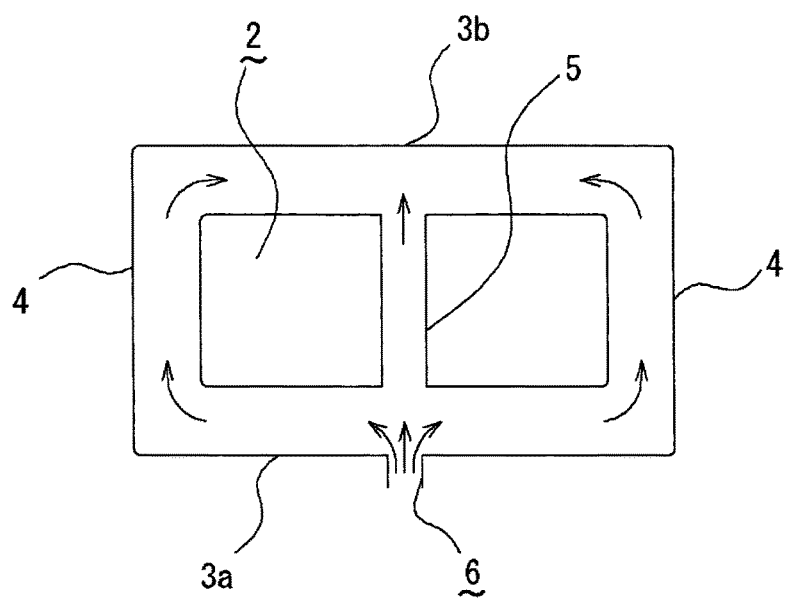
FIG. 2 is a schematic cross-sectional view showing a flow of molten metal for the aluminum product of the first embodiment.

A flow of the molten metal in the die casting process for producing the product 1A is as shown in FIG. 2. After injected into the gate 6, the molten metal passes through the gate 6, and thereafter spreads and flows toward the bridge 5 as well as the left and right connecting portions 4, eventually flowing into the other opposing portion 3b.

Second Embodiment

Figure 3:
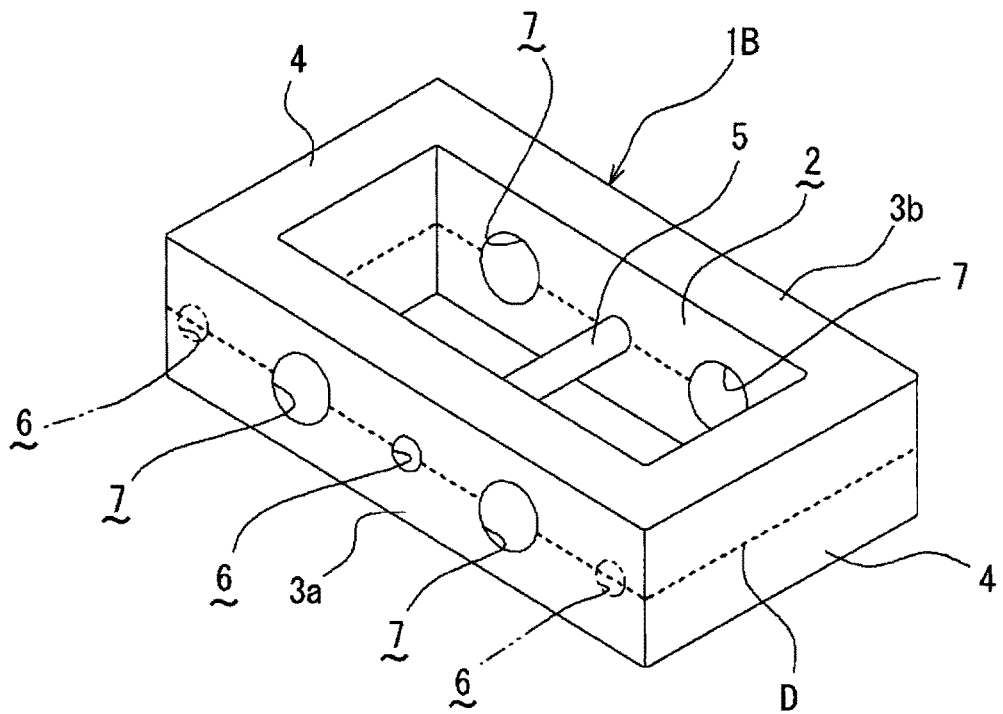
FIG. 3 is a perspective view showing a second embodiment of the aluminum product produced using the die casting process of the present invention.

As shown in FIG. 3, an aluminum product 1B (hereinafter referred to as a product 1B) of a second embodiment is different from the aluminum product 1A of the first embodiment in that: round opening portions 7, which are through-holes, are provided on the two sides of the center portion in each of the opposing portions 3a, 3b of the product 1A of the first embodiment; and the molten metal passage includes portions where the cross-sectional area of the passage is reduced, i.e., portions where passage resistance against the molten metal is increased. The rest of the product 1B of the second embodiment is the same as the first embodiment. For this reason, the same components will be denoted by the same reference signs, and descriptions for such components will be omitted. The hollow portion 2, the opposing portions 3a, 3b each including the round opening portions 7, the connecting portions 4 and the bridge 5 are formed by filling the molten metal into the cavity formed by the die halves, albeit not illustrated.

Figure 4:
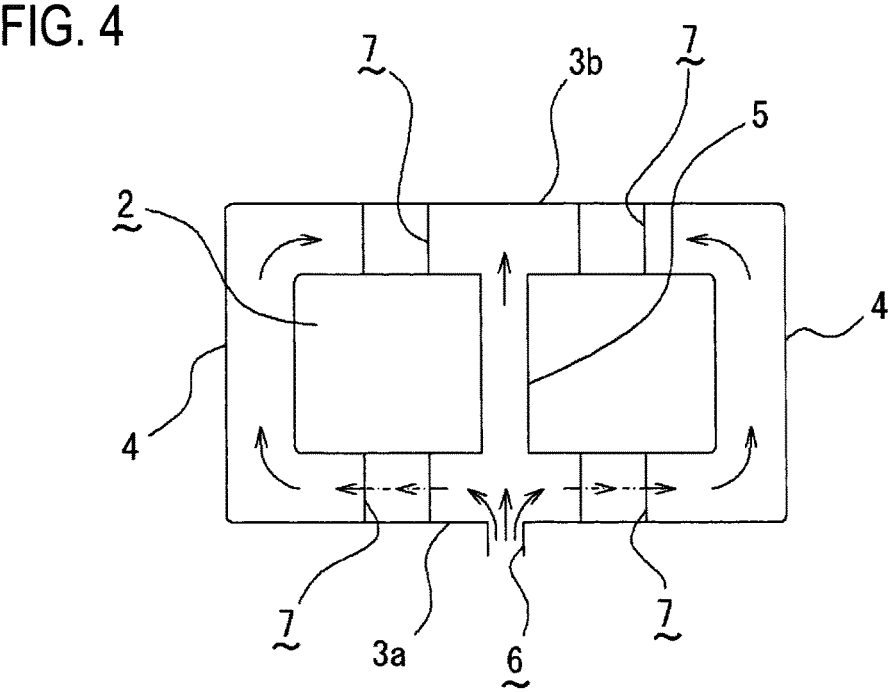
FIG. 4 is a schematic cross-sectional view showing a flow of molten metal for the aluminum product of the second embodiment.

A flow of the molten metal in the die casting process for producing the product 1B is as shown in FIG. 4. After reaching the gate 6, the molten metal passes through the gate 6, and thereafter spreads and flows toward the bridge 5 as well as the left and right connecting portions 4, eventually flowing into the other opposing portion 3b. In this case, the molten metal flows in the opposing portions 3a, 3b in a way to surround the round opening portions 7.

Third Embodiment

Figure 5:
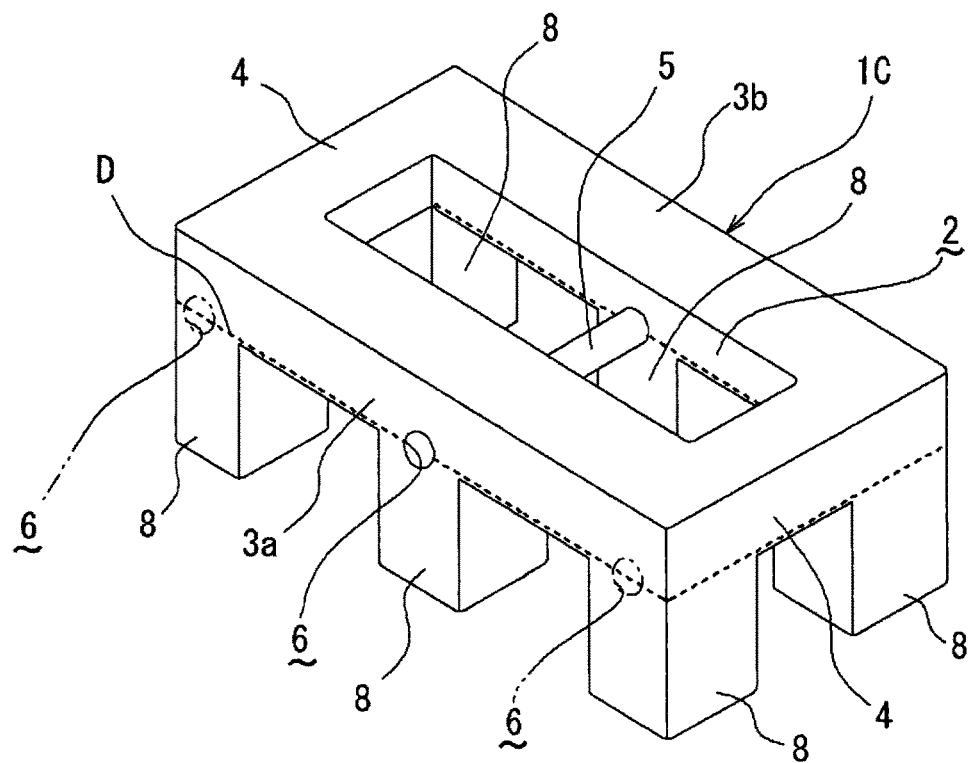
FIG. 5 is a perspective view showing a third embodiment of the aluminum product produced using the die casting process of the present invention.

As shown in FIG. 5, an aluminum product 1C (hereinafter referred to as a product 1C) of a third embodiment is different from the product 1A of the first embodiment in that: leg portions 8 each with a rectangular cross section are provided respectively in the center portion as well as both of the left and right end portions in each of the opposing portions 3a, 3b of the product 1A of the first embodiment; and there are portions (the leg portions 8) in parts of the molten metal passage, each of which recedes from an end near the gate 6 of a segment (the connecting portion 4) having a small cross section for the molten metal passage to define a large volume. The rest of the product 1C of the third embodiment is the same as the first embodiment. For this reason, the same components will be denoted by the same reference signs, and descriptions for such components will be omitted. The hollow portion 2, the opposing portions 3a, 3b each including the leg portions 8, the connecting portions 4 and the bridge 5 are formed by filling the molten metal into the cavity formed by the die halves, albeit not illustrated.

Figure 6:
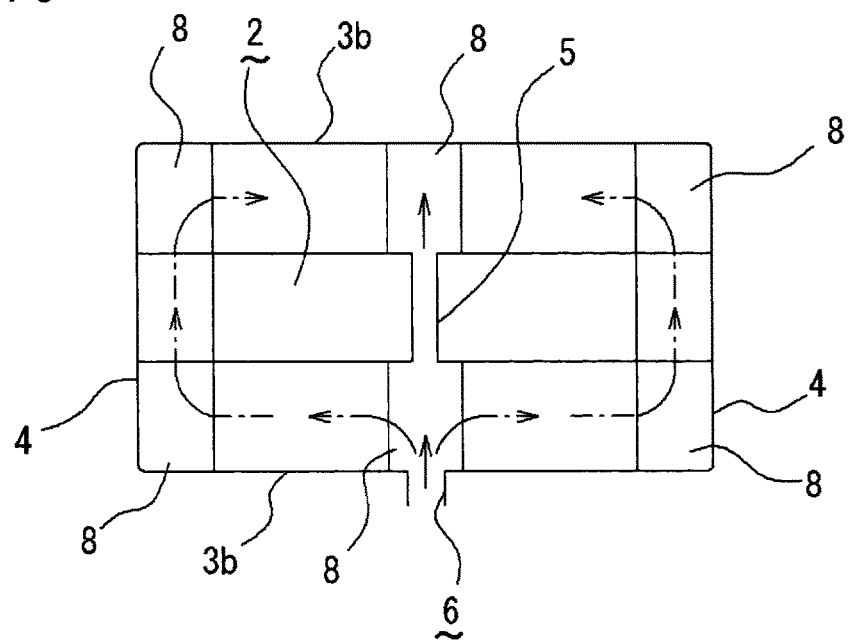
FIG. 6 is a schematic cross-sectional view showing a flow of molten metal for the aluminum product of the third embodiment.

A flow of the molten metal in the die casting process for producing the product 1C is as shown in FIG. 6. After reaching the gate 6, the molten metal passes through the gate 6, and thereafter spreads and flows toward the bridge 5 as well as the left and right connecting portions 4, eventually flowing into the other opposing portion 3b. In this case, the molten metal flowing through the opposing portions 3a, 3b flows into the leg portions 8 as well.

Fourth Embodiment

Figure 7:
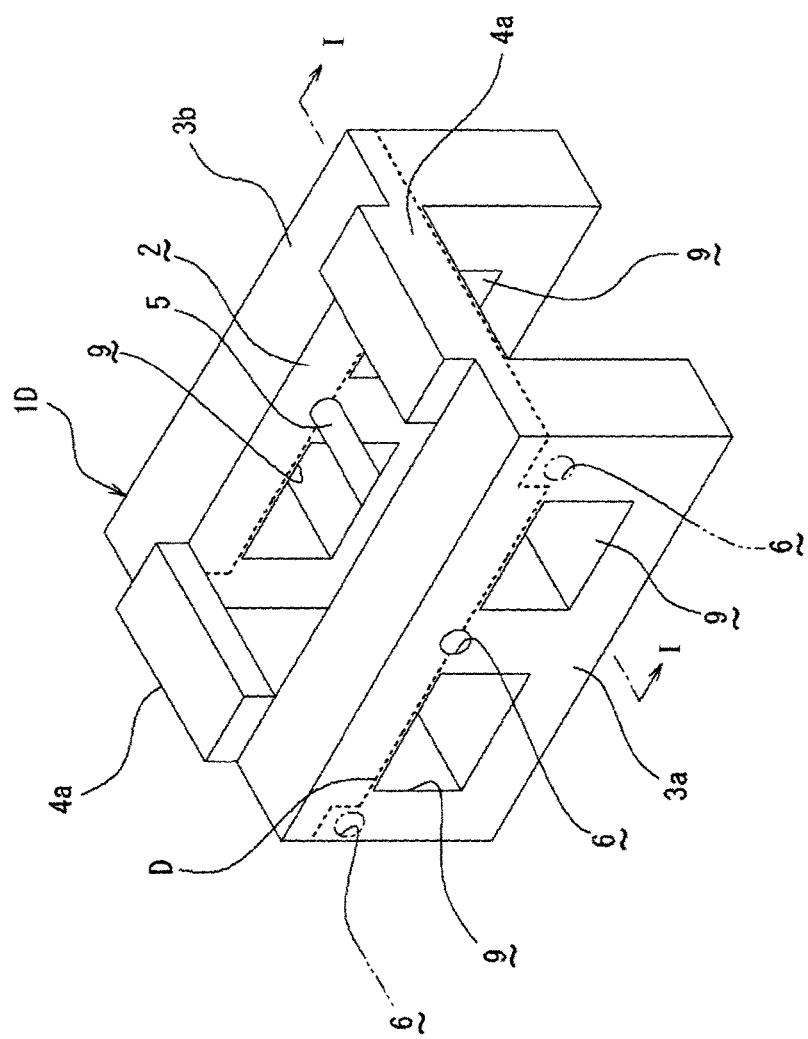
FIG. 7 is a perspective view showing a fourth embodiment of the aluminum product produced using the die casting process of the present invention.
Figure 9:
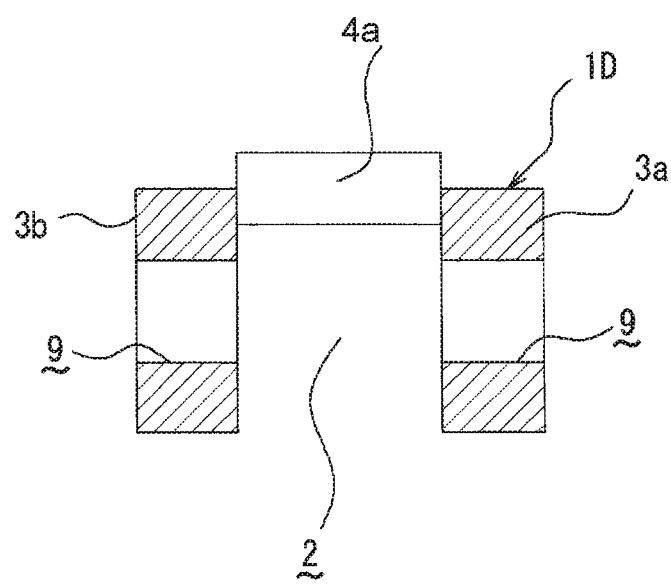
FIG. 9 is a cross-sectional view taken along the I-I line of FIG. 7.

As shown in FIGS. 7 and 9, an aluminum product 1D (hereinafter referred to as a product 1D) of a fourth embodiment is different from the product 1A of the first embodiment in that rectangular opening portions 9, which are through-holes, are provided respectively on the two sides of the center portion in each of the opposing portions 3a, 3b of the product 1A of the first embodiment, and in that connecting portions 4a are provided elevated above the upper surfaces of the opposing portions 3a, 3b. Furthermore, the fourth embodiment is different from the first embodiment in that: the molten metal passage includes portions where the cross-sectional area of the passage is reduced, i.e., portions where passage resistance against the molten metal is increased; and there are portions in parts of the molten metal passage, each of which recedes from an end near the gate 6 of a segment with a small cross section for the molten metal passage to define a large volume. Moreover, the fourth embodiment is different from the first embodiment in that the parting line D between the die halves is shaped like steps, and extends along upper end surfaces of the rectangular opening portions 9 in each of the opposing portions 3a, 3b, and along lower surfaces of the connecting portions 4.

It should be noted that the rectangular opening portions 9 provided to the product 1D of the fourth embodiment is formed using cores (not illustrated). Furthermore, the rest of the product of the fourth embodiment is the same as the first embodiment. For this reason, the same components will be denoted by the same reference signs, and descriptions for such components will be omitted.

Figure 8:
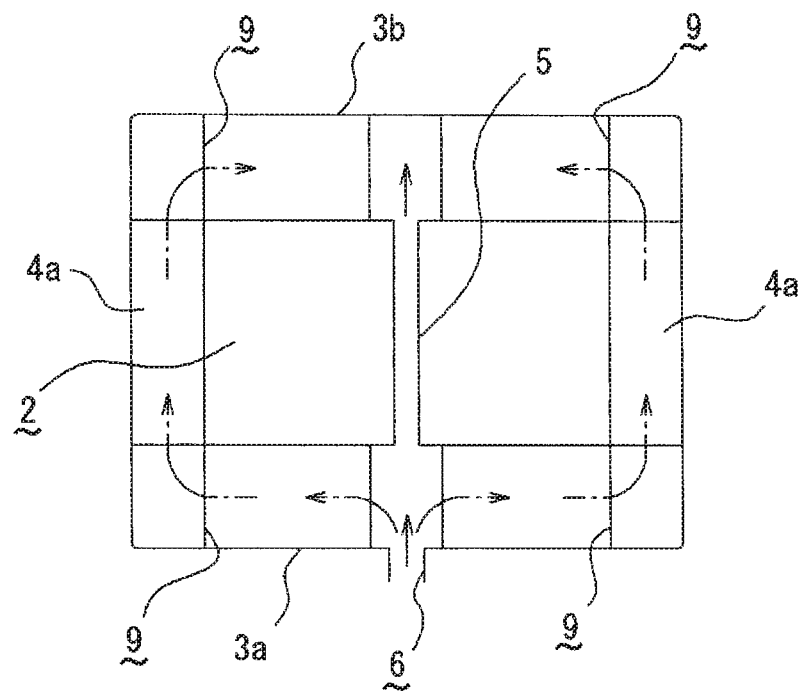
FIG. 8 is a schematic cross-sectional view showing a flow of molten metal for the aluminum product of the fourth embodiment.

A flow of the molten metal in the die casting process for producing the product 1D is as shown in FIG. 8. After reaching the gate 6, the molten metal passes through the gate 6, and thereafter spreads and flows toward the bridge 5 as well as the left and right elevated connecting portions 4a, eventually flowing into the other opposing portion 3b. In this case, the molten metal flows through the opposing portions 3a, 3b in a way to surround the rectangular opening portions 9.

Fifth Embodiment

A fifth embodiment is a case of applying the aluminum product to an aluminum brake caliper 10.

Figure 10A:
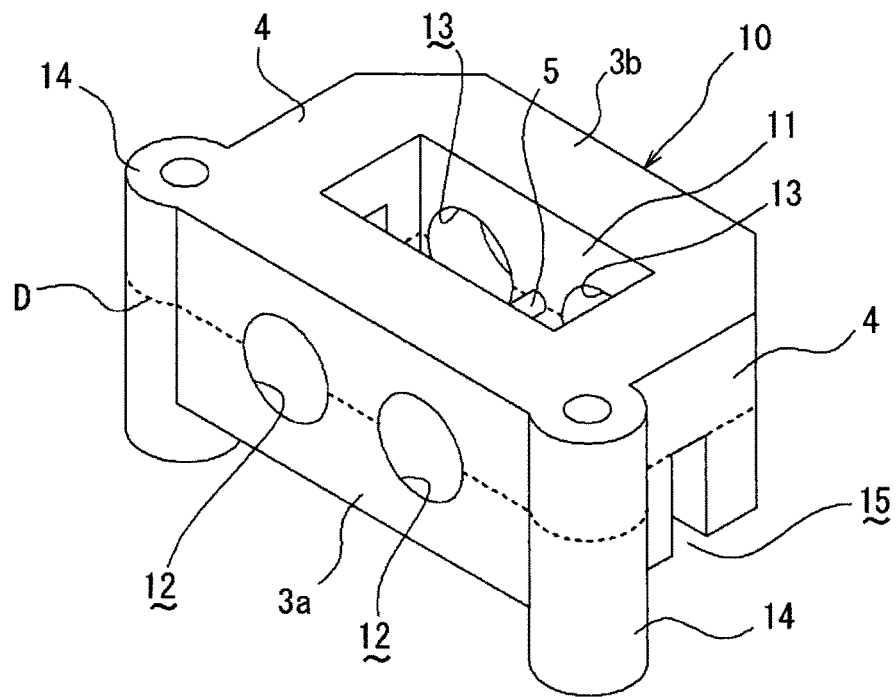
FIG. 10A is a perspective view showing an aluminum brake caliper produced by the die casting process of the present invention.
Figure 10B:
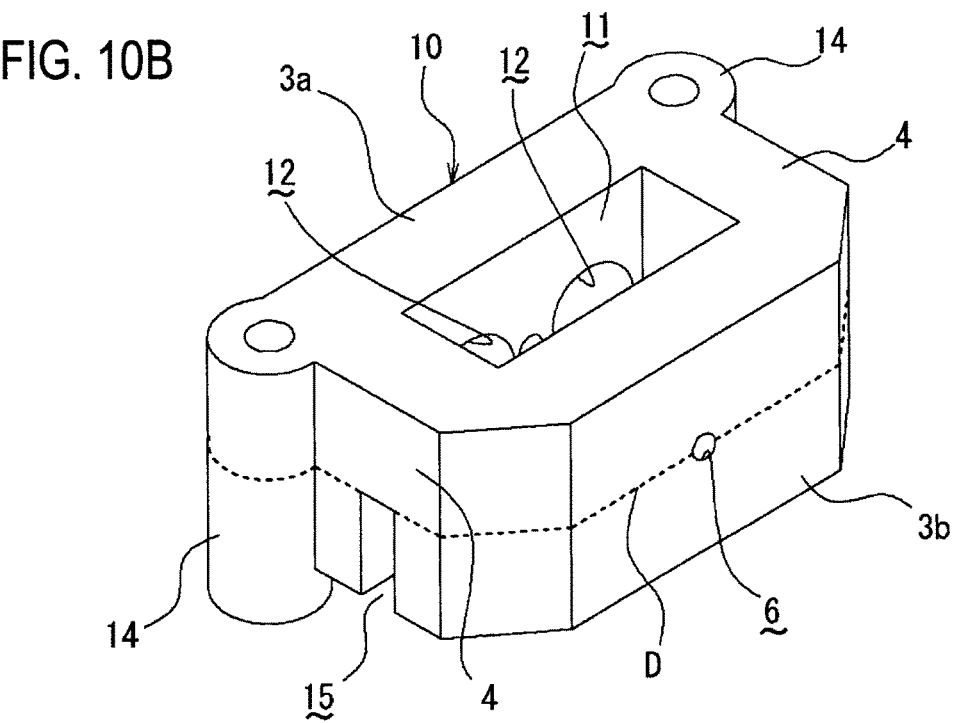
FIG. 10B is a rear perspective view corresponding to FIG. 10A.

As shown in FIGS. 10A and 10B, in the brake caliper 10, the hollow portion of any one of the first to fourth embodiments forms a disc housing space 11; cylinder forming portions 12 each made from a through-hole into which to slidably insert and fit a piston are provided respectively in positions on the two sides of the center portion in the opposing portion 3a out of the opposing portions 3a, 3b; cylinder forming portions 13 each made from a recessed part are provided respectively in parts of the other opposing portion 3b which are opposed to the cylinder forming portions 12; and the molten metal gate 6 is provided in an intermediate portion between the cylinder forming portions 13 in the opposing portion 3b. In addition, thick cylindrical portions 14 to which to attach a brake are projectingly provided to both of the left and right sides of the opposing portion 3a, and a slit 15 is provided in a center lower portion of each connecting portion 4. Here, plate-shaped attachment portions may be provided instead of the thick cylindrical portions 14.

Each cylinder forming portion 12 and the corresponding cylinder forming portion 13 being the recessed part, which are provided to the brake caliper 10 of the fifth embodiment, are formed on a straight line by use of the same core (not illustrated). The gate 6 is formed in the opposing portion 3b including the cylinder forming portions 13, which is not on the side from which the cores are detached. Although each of the cylinder forming portions 12, 13 has a shape of a circle in the drawings, the cylinder forming portions 12, 13 may be formed into shapes other than the circle such as a semicircle.

It should be noted that the rest of the fifth embodiment is the same as the first embodiment. For this reason, the same components will be denoted by the same reference signs, and descriptions for such components will be omitted.

A flow of the molten metal in the die casting process for producing the brake caliper 10 is as shown in FIG. 11(a). After reaching the gate 6, the molten metal passes through the gate 6, and thereafter spreads and flows toward the bridge 5 as well as the left and right connecting portions 4, eventually flowing into the other opposing portion 3a. In this case, the molten metal flows in the opposing portion 3b in a way to surround the cylinder forming portions 13. In addition, the molten metal flows in the other opposing portion 3a in a way to surround the cylinder forming portions 12, and flows into the left and right thick cylindrical portions 14.

Although FIG. 11(a) describes the case where the single gate 6 is provided in the center portion of the opposing portion 3b, two more gates 6 may be provided respectively in the two sides of the opposing portion 3b, and the molten metal may be poured in through the three gates 6.

Other Embodiments

Although the foregoing descriptions have been provided for the embodiments each provided with the single bridge 5, the number of bridges 5 does not have to be one. For example, as shown with chain double-dashed lines in FIG. 1, bridges 5 may be provided respectively at positions on the two sides of the bridge 5 in the center portion.

Figure 12A:
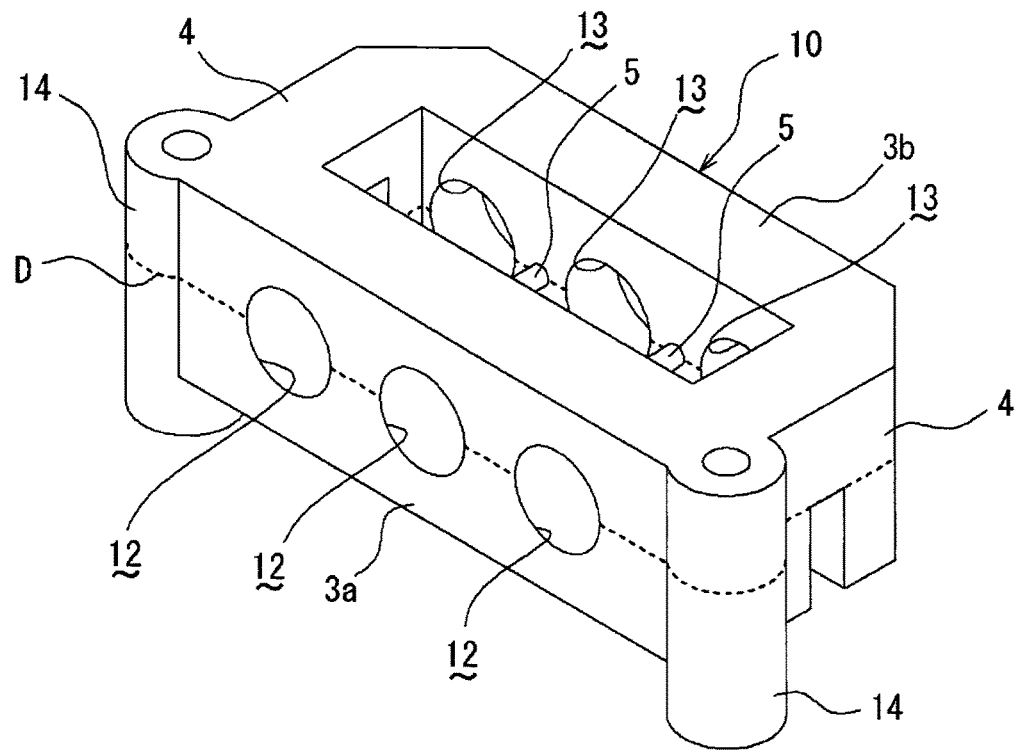
FIG. 12A is a perspective view showing a different aluminum brake caliper produced by the die casting process of the present invention.
Figure 12B:
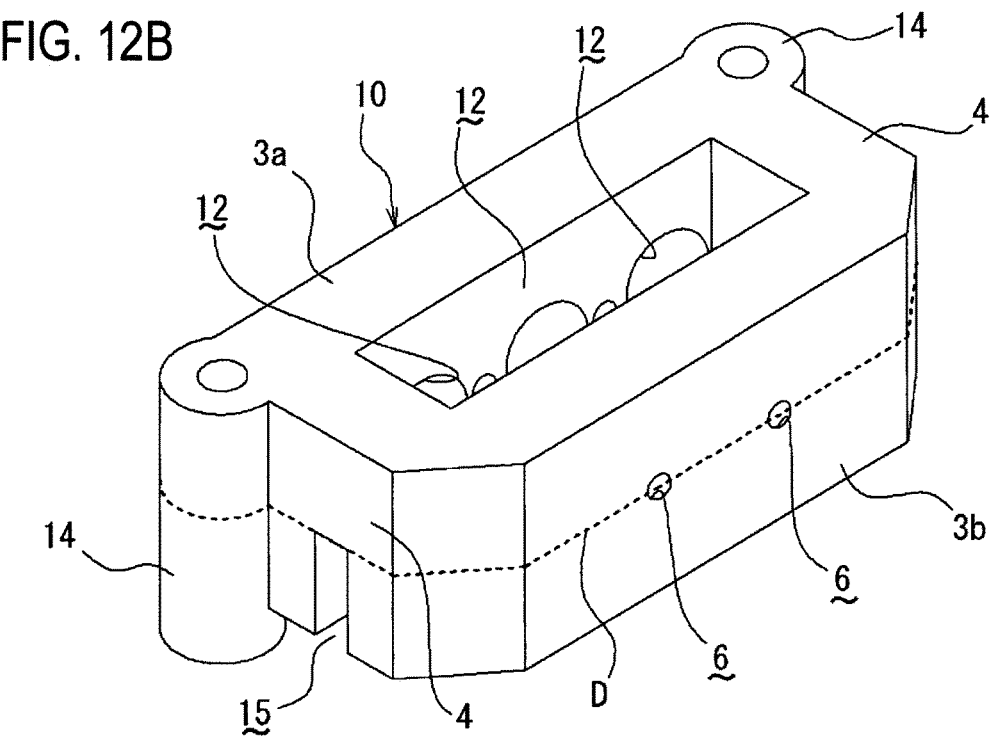
FIG. 12B is a rear perspective view corresponding to FIG. 12A.
Figure 13:
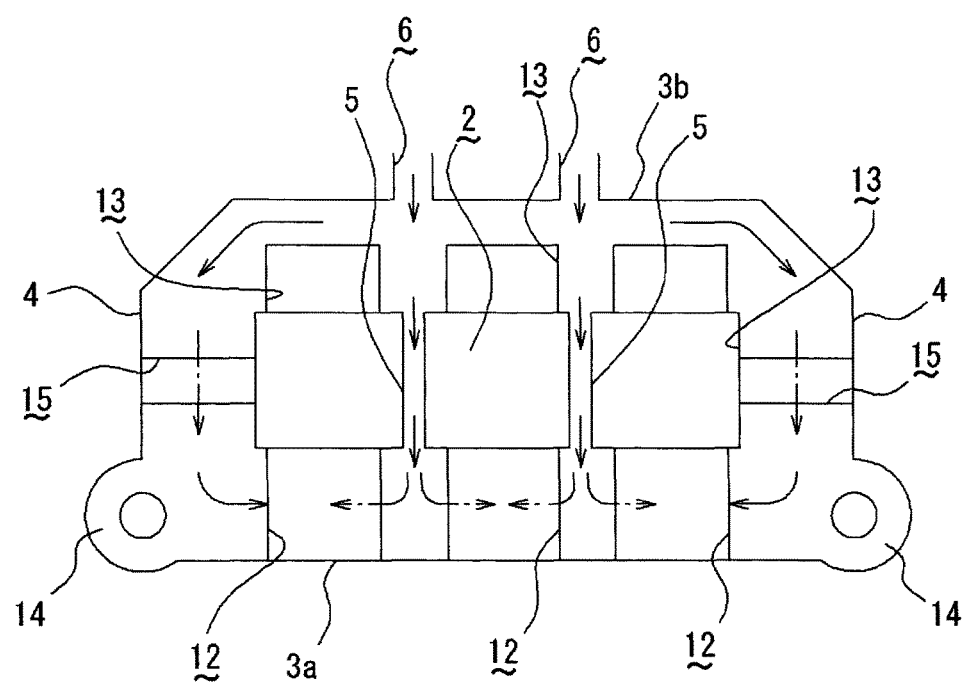
FIG. 13 is a schematic cross-sectional view showing a flow of molten metal for the different brake caliper.
Figure 14:
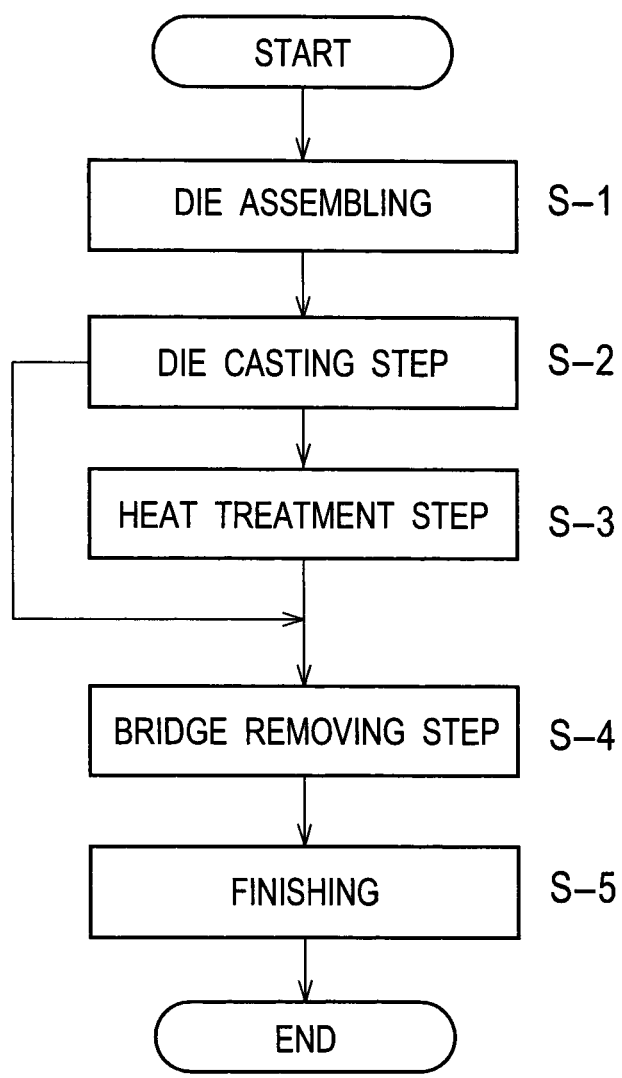
FIG. 14 is a flowchart showing steps in a first manufacturing method of the present invention.
Figure 15:
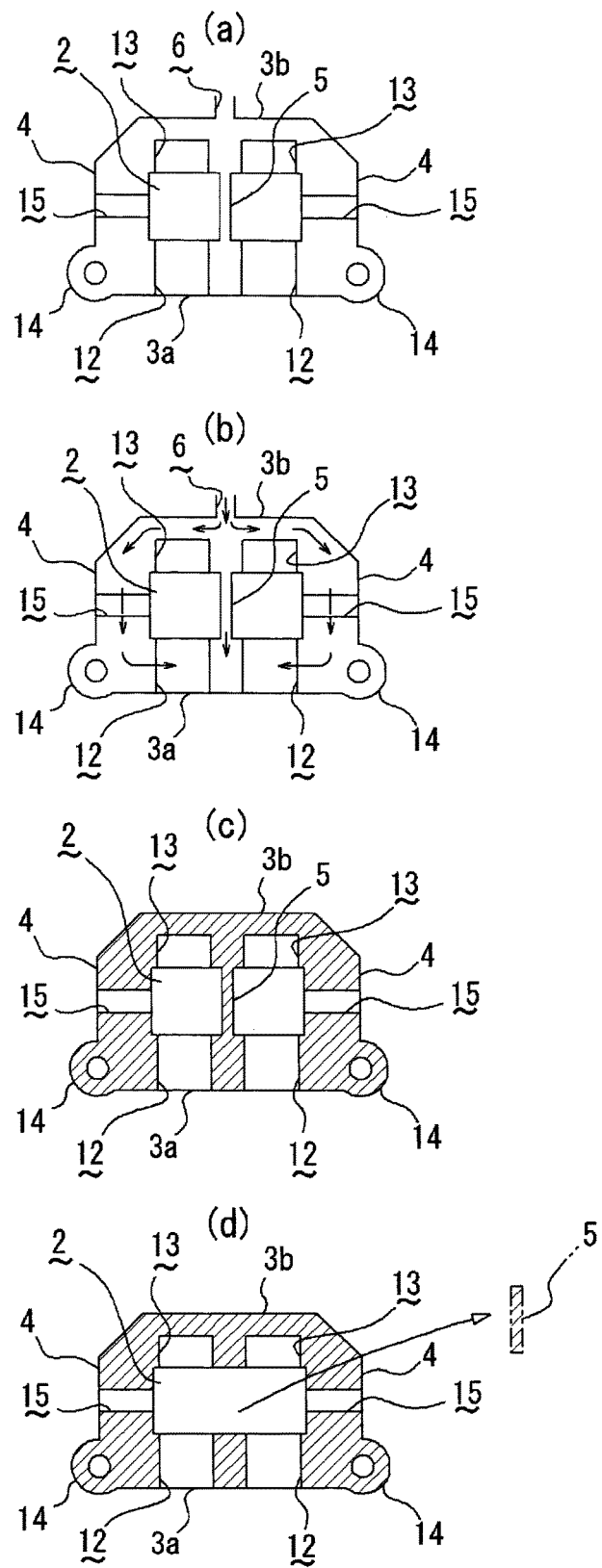
FIGS. 15a-15d include schematic cross-sectional views showing steps for a product to be produced by the first manufacturing method.

In addition, although the fifth embodiment has described the brake caliper 10 including the single bridge 5 and the two cylinder forming portions 12, the brake caliper 10 may instead include, as shown in FIG. 12, for example: cylinder forming portions 12 formed at three positions and cylinder forming portions 13 formed at three positions; bridges 5 each placed between adjacent two of the cylinder forming portions 12 as well as between adjacent two of the cylinder forming portions 13, whereby the molten metal flowing through each bridge 5 may be caused to flow to the two adjacent cylinder forming portions 12 and to the two adjacent cylinder forming portions 13.

This configuration makes it possible to improve the flow and run of the molten metal.

Next, referring to FIGS. 14 to 17, detailed descriptions will be provided for manufacturing methods of the present invention. The following descriptions will be provided for the manufacturing methods in which the aluminum product is the brake caliper 10 of the fifth embodiment.

Manufacturing Method 1

<Step S-1: Die Assembling>

The die is assembled and the cores (not illustrated) are used to form the cavities for: the opposing portions 3a, 3b opposed to each other with the housing space 11 interposed in between; the connecting portions 4 connecting the two sides of the opposing portion 3a to the two sides of the opposing portion 3b, respectively; the bridge 5 connecting the center portion of the opposing portion 3a to the center portion of the opposing portion 3b; and the thick cylindrical portions 14 projecting from both the left and right sides of the opposing portion 3a. Concurrently, the cylinder forming portions 12 are formed at the respective positions on the two sides of the bridge 5 in the opposing portion 3a; and the cylinder forming portions 13 are formed in the other opposing portion 3b (see FIG. 15(a)).

<Step S-2: Die Casting Step>

The molten metal is poured in from the gate 6 provided in the opposing portion 3b, and is made to flow into the molten metal passages for the opposing portions 3a, 3b, the connecting portions 4, the bridge 5 and the thick cylindrical portions 14. Thereby, after passing through the gate 6, the molten metal spreads and flows toward the bridge 5 as well as the left and right connecting portions 4, eventually flowing into the other opposing portion 3a. In this case, the molten metal flows through the opposing portion 3b in a way to surround the cylinder forming portions 13. In addition, the molten metal flows through the other opposing portion 3a in a way to surround the cylinder forming portions 12, and flows to the left and right thick cylindrical portions 14 (see FIG. 15(b)).

Here, of the aluminum alloys for die casting, ADC3 (Cu: 0.6 weight percent, Si: 9.0 to 10.0 weight percent, Mg: 0.4 to 0.6 weight percent, Zn: 0.5 weight percent, Fe: 1.3 weight percent, Mn: 0.3 weight percent, Ni: 0.5 weight percent, Sn: 0.1 weight percent, and Al for the rest), for example, is used for the molten metal because of its excellence in pressure resistance, mechanical properties and corrosion resistance.

In the die casting process, it is desirable that for the molten metal, the ratio of the cross-sectional area of the bridge 5 to the opening area of the gate 6 be set in a range of 0.5 to 10.

The reason for this is as follows. If the ratio of the cross-sectional area of the bridge 5 to the opening area of the gate 6 is less than 0.5, resistance against the molten metal increases in the opposing portion 3a, and the effect on the improvement in the run of the molten metal thus decreases. On the other hand, if the ratio of the cross-sectional area of the bridge 5 to the opening area of the gate 6 is greater than 10, the volume of the bridge 5 becomes too large, and the proportion of a part not essentially required thus increases. This is disadvantageous in terms of costs reflecting an increase in workload of a removal process and the like.

<Step S-3: Heat Treatment Step>

After the die casting process, the semi-finished product including the bridge 5 produced by the die casting process is subjected to a heat treatment (for example, a T6 treatment). To put it specifically, the semi-finished product is subjected to solutionizing, and thereafter to artificial age hardening. In this case, the solutionizing is performed at a temperature in a range of 480° C. to 520° C. for a time in a range of 30 minutes to five hours. After quenching by water cooling, the aging is performed at a temperature in a range of 150° C. to 180° C. for a time in a range of three to six hours (see FIG. 15(c)).

During this heat treatment (the T6 treatment), since the semi-finished product has the bridge 5 in the housing space 11, the semi-finished product is prevented or prevented from deformation attributed to the heat treatment. In addition, since the semi-finished product is softened by the high temperature during the solutionizing in the heat treatment process, it is possible to make the semi-finished product less likely to deform during the quenching after the solutionizing.

<Step S-4: Bridge Removing Step>

After the heat treatment is performed in the above-described manner, the bridge 5 connecting the two opposing portions 3a, 3b is cut off from the opposing portions 3a, 3b (see FIG. 15(d)).

<Step S-5: Finishing>

After the bridge 5 is cut off, communication passages for hydraulic oil communicating with the cylinder forming portions 12 are formed by machining, whereby the brake caliper 10 is produced. In this case, the communication passages can be formed with a tool such as a drill. After the communication passages are formed, supply ports for the hydraulic oil are formed at drill insertion openings. Meanwhile, unnecessary drill insertion openings are closed with plugs.

Manufacturing Method 2

Figure 16:
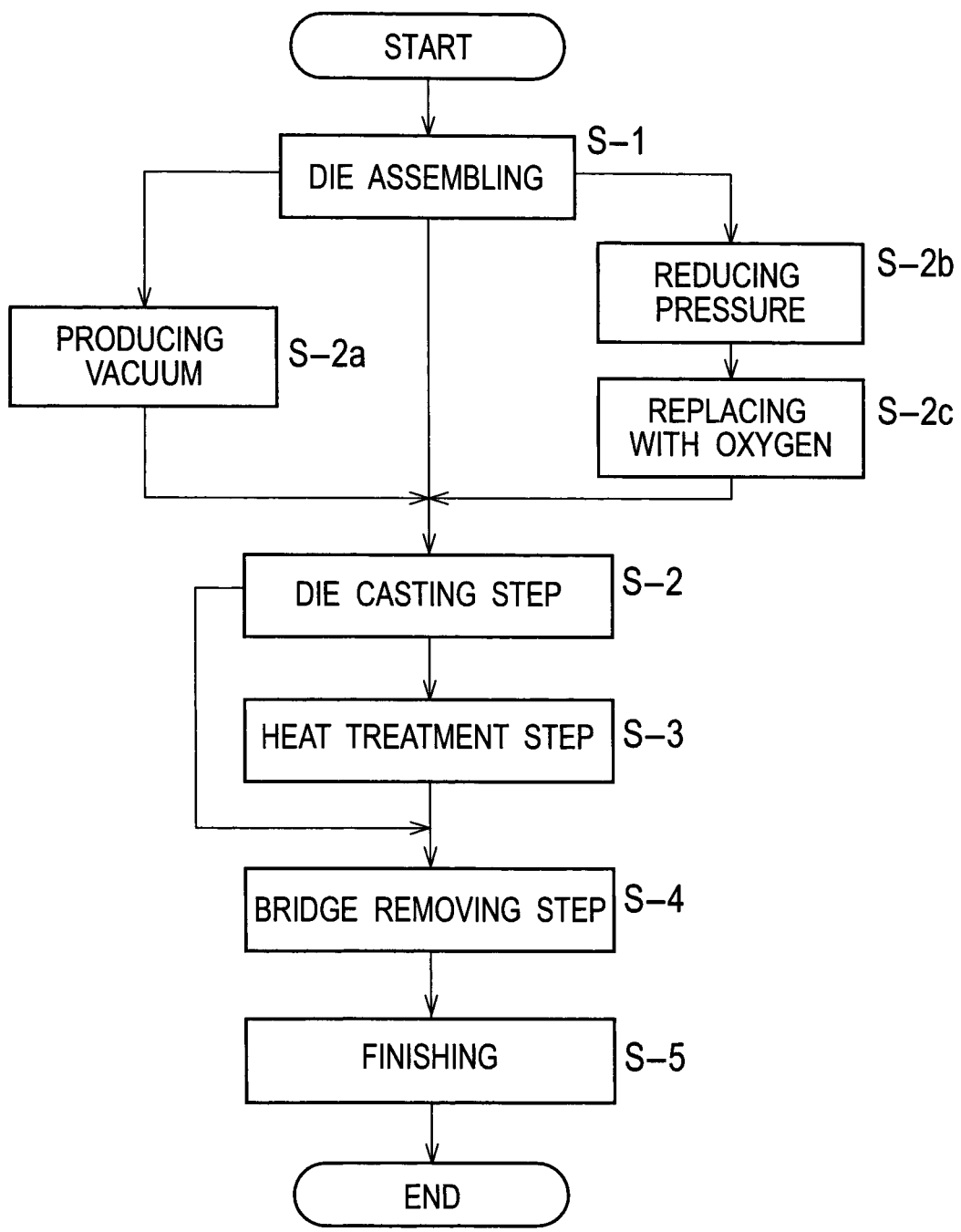
FIG. 16 is a flowchart showing steps in a second manufacturing method of the present invention.
Figure 17:
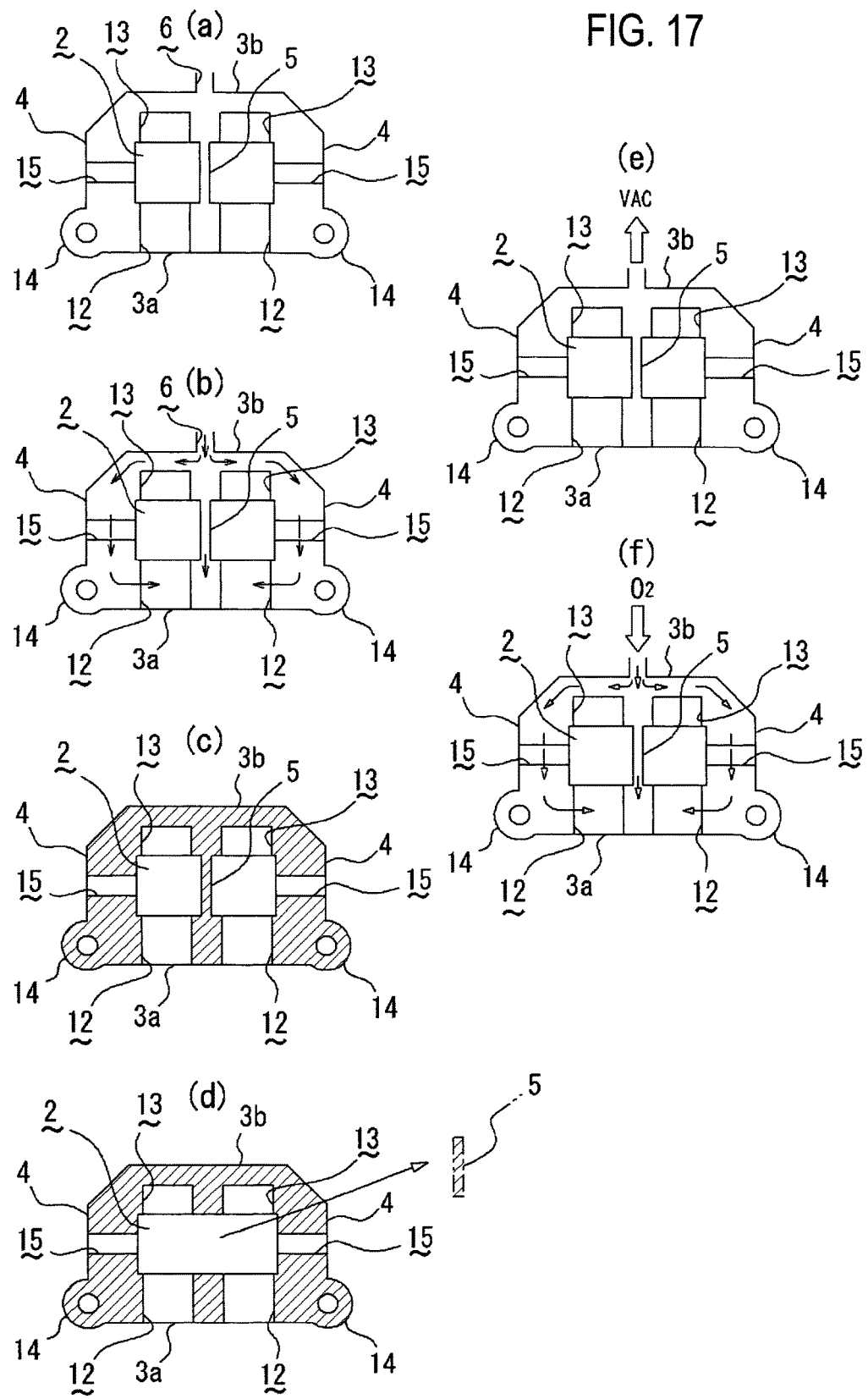
FIGS. 17a-17f include schematic cross-sectional views showing steps for a product to be produced by the second manufacturing method.

As shown in FIGS. 16 and 17, a manufacturing method includes die assembling (step S-1, see FIG. 17(a)), a die casting step (step S-2, see FIG. 17(b)), a heat treatment step (step S-3, see FIG. 17(c)), and a bridge removing step (step S-4, see FIG. 17(d)) like the manufacturing method. However, the manufacturing method is different from the manufacturing method in the following points.

To put it specifically, before the molten metal is poured (injected and filled) in the die casting step in the manufacturing method, the manufacturing method produces a vacuum in the cavities, formed by die halves, for the opposing portions 3a, 3b, the connecting portions 4 connecting the two sides of the opposing portion 3a to the two sides of the opposing portion 3b, the bridge 5 connecting the center portion of the opposing portion 3a to the center portion of the opposing portion 3b, and the thick cylindrical portions 14 projecting from both the left and right sides of the opposing portion 3a (step S-2a, see FIG. 17(e)). Alternatively, the manufacturing method reduces pressure in the cavities (step S-2b), and thereafter replaces air in the cavities with an oxygen gas ($O_2$) by supplying the oxygen gas to the cavities (step S-2c, see FIG. 17(f)).

After the vacuum is produced in the cavities or the air in the cavities is replaced with the oxygen gas, the molten metal is poured (injected and filled) into the cavities. Thereby, small bubbles in the molten metal and gas porosity defects can be prevented. Furthermore, the use of the vacuum die casting or the oxygen-atmosphere die casting makes it possible to obtain an excellent product by preventing gas porosity defects, and to perform the T6 treatment appropriately.

Although the foregoing descriptions have been provided for the manufacturing methods in which the aluminum product is the aluminum brake caliper, the aluminum products 1A to 1D of the first to fourth embodiments, other than the brake caliper 10, can also be produced by use of the manufacturing method or the manufacturing method.

In addition, although the foregoing descriptions have been provided for the embodiments in which the heat treatment step is performed after the die casting step, the bridge removing step may be performed by skipping the heat treatment step.

In the embodiments with the foregoing configurations, the molten metal poured from the one opposing portion 3a or 3b out of the opposing portions 3a, 3b opposed to each other with the hollow portion 2 (the housing space 11) interposed in between is made to flow to the other opposing portion 3b or 3a via the connecting portions 4 on the two sides and the bridge 5 connecting the two opposing portions 3a, 3b. Thereby, it is possible to improve the flow and run of the molten metal. For this reason, it is possible to enhance the productivity and to enhance the quality by preventing small bubbles in the molten metal and gas porosity defects.

Moreover, since the semi-finished product cast in the die casting step is subjected to the heat treatment such as the T6 treatment (the treatment to perform solutionizing, quenching, and artificial age hardening), the strength of the product can be increased. In addition, since the bridge 5 is provided in the hollow portion of the semi-finished product, deformation of the product can be prevented or inhibited even though the semi-finished product is quickly cooled by water cooling after the solutionizing. For this reason, the rigidity of the product can be increased.

Besides, since the vacuum is produced in the cavities or the air in the cavities is replaced with the oxygen gas before the molten metal is poured in the die casting step, bubbles in the molten metal and gas porosity defects can be prevented. For this reason, the quality can be further enhanced.

In addition, since the gate 6 for the molten metal and the bridge 5 are formed on the parting line D between the die halves for forming the oil passages, the flow and run of the molten metal can be improved.

Furthermore, when the opposing portions 3a, 3b are connected by the multiple bridges 5, the flow and run of the molten metal can be improved. Moreover, when the molten metal is poured in from the multiple gates 6, the flow and run of the molten metal can be improved. For this reason, it is possible to further enhance the productivity, and to further enhance the quality.

REFERENCE SIGNS LIST 1A to 1D aluminum product
2 hollow portion
3a, 3b opposing portion
4 connecting portion
5, 5a, 5b bridge
6 gate
7 round opening portion
8 leg portion
9 rectangular opening portion
10 brake caliper
11 housing space
12 cylinder forming portion
13 cylinder forming portion
14 thick cylindrical portion
15 slit

The invention claimed is:

1. An aluminum brake caliper manufacturing method using die casting for manufacturing an aluminum brake caliper provided with opposing portions opposed to each other with a hollow portion forming a disc housing space interposed in between, and connecting portions connecting the opposing portions at two sides thereof, wherein a cylinder forming portion made from a through-hole into which to slidably insert and fit a piston is provided in one of the opposing portions, an another cylinder forming portion made from a recessed portion is provided in a part of the other opposing portion which is opposed to the cylinder forming portion, and the through-hole and the recessed portion are formed by use of a core, the method comprising:

performing die casting by pouring molten metal of an aluminum alloy from a gate for the molten metal formed in the opposing portion including the recessed portion via the connecting portions and a bridge connecting the two opposing portions; and removing the bridge.

2. The aluminum brake caliper manufacturing method using die casting according to claim 1, wherein the brake caliper involves a molten metal passage from the gate, and the molten metal passage includes portions where the cross-sectional area of the passage is reduced.

3. The aluminum brake caliper manufacturing method using die casting according to claim 1, wherein a cross section of the bridge has a shape of any one of a circle and a horizontally long ellipse.

4. The aluminum brake caliper manufacturing method using die casting according to claim 1, wherein a cross section of the bridge has a shape of a polygon.

5. The aluminum brake caliper manufacturing method using die casting according to claim 1, wherein the bridge is formed on a straight line from the gate.

6. The aluminum brake caliper manufacturing method using die casting according to claim 1, wherein a ratio of a cross-sectional area of the bridge to an opening area of the gate for the molten metal is in a range of 0.5 to 10.

7. The aluminum brake caliper manufacturing method using die casting according to claim 1, wherein the through-hole and the recessed portion are formed by use of the same core in a way to be arranged on a straight line.

8. The aluminum brake caliper manufacturing method using die casting according to claim 1, further comprising subjecting a semi-finished product cast in the die casting to a heat treatment before the bridge removing.

9. The aluminum brake caliper manufacturing method using die casting according to claim 8, wherein the heat treatment comprises solutionizing.

10. The aluminum brake caliper manufacturing method using die casting according to claim 9, comprising quenching by water cooling after the solutionizing.

11. The aluminum brake caliper manufacturing method using die casting according to claim 1, wherein the die casting is performed using any one of vacuum die casting, oxygen-atmosphere die casting, and a combination of the vacuum die casting and the oxygen-atmosphere die casting.

12. The aluminum brake caliper manufacturing method using die casting according to claim 1, wherein the molten metal is poured in from a plurality of the gates.

13. The aluminum brake caliper manufacturing method using die casting according to claim 1, wherein
the recessed portions are formed respectively in two places in a center portion of the housing space, and
the bridge is situated in an intermediate portion between the two recessed portions.

14. The aluminum brake caliper manufacturing method using die casting according to claim 1, wherein
the recessed portions are formed respectively in at least three places, and
the bridge is situated between each adjacent two of the recessed portions.

* * * * *